March 24, 1953 P. S. MARTIN 2,632,463
AUTOMATIC POULTRY FOUNTAIN
Filed July 20, 1949 2 SHEETS—SHEET 1
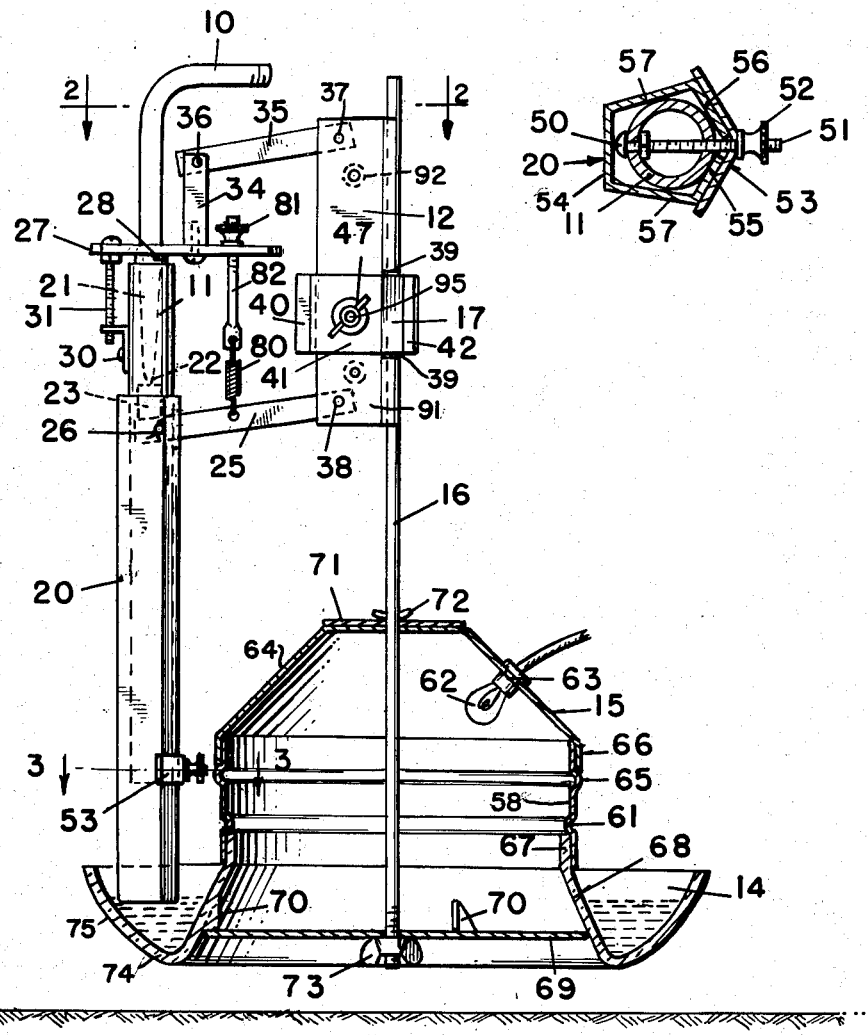
Inventor:
PERRY S. MARTIN,
By Henry H. Snelling
Attorney March 24, 1953 P. S. MARTIN 2,632,463
AUTOMATIC POULTRY FOUNTAIN Filed July 20, 1949 2 SHEETS—SHEET 2

Inventor:
PERRY S. MARTIN,
By *Henry H. Smelling*
Attorney

Patented Mar. 24, 1953

2,632,463

UNITED STATES PATENT OFFICE 2,632,463

AUTOMATIC POULTRY FOUNTAIN

Perry S. Martin, Harrisonburg, Va., assignor to Shenandoah Equipment Company, Harrisonburg, Va., a firm Application July 20, 1949, Serial No. 105,877

3 Claims. (Cl. 137—408)

This invention relates to a drinking fountain and has for its principal object the provision of a simple fountain which can be adjusted as the chicks grow in size and thus avoid the usual plurality of drinking fountains required.

A further object of the invention is to provide a drinking fountain in which the trough is self cleaning, holding so little water that the rapid turnover itself keeps the water fresh and clean. The shape of the trough is such that the chicks agitate the feed washed from the bills of other chicks. In practice these troughs have gone for long periods without the slightest need for washing.

An important feature of the present invention is to provide a poultry fountain which encourages the drinking of water at night without furnishing any tendency for the chicks to feed at the same time. An incidental object of the invention is to promote cleanliness by barring the roosting of the chicks on any part of the device, preventing a chick from jumping over any portion of the trough and preventing the chicks from drinking directly from the end of the water supply pipe. In many fountains the end of the water pipe is somewhat above the water level in the trough and the chicks enjoy reaching up and drinking the last drop from the pipe. The objection is that the chick gets wet during this process.

While I do not wish to have the invention limited to a specific form or any particular size, I find it convenient to make the trough about 9" in diameter and less than a foot high when contracted to its shortest over-all height, as such a trough, while holding only from 6 to 8 ounces of water, will readily supply up to 250 chicks. As these devices are more frequently than not used in pairs, two of the fountains will take care of up to 500 chicks and will provide for them as they grow from chicks to broilers or even longer.

In the drawings:

Figure 1 is a side elevation, partly in section.

Figure 2 is a sectional view along the line 2—2 of Figure 1.

Figure 3 is a section on line 3—3 of Figure 1.

Figure 4:
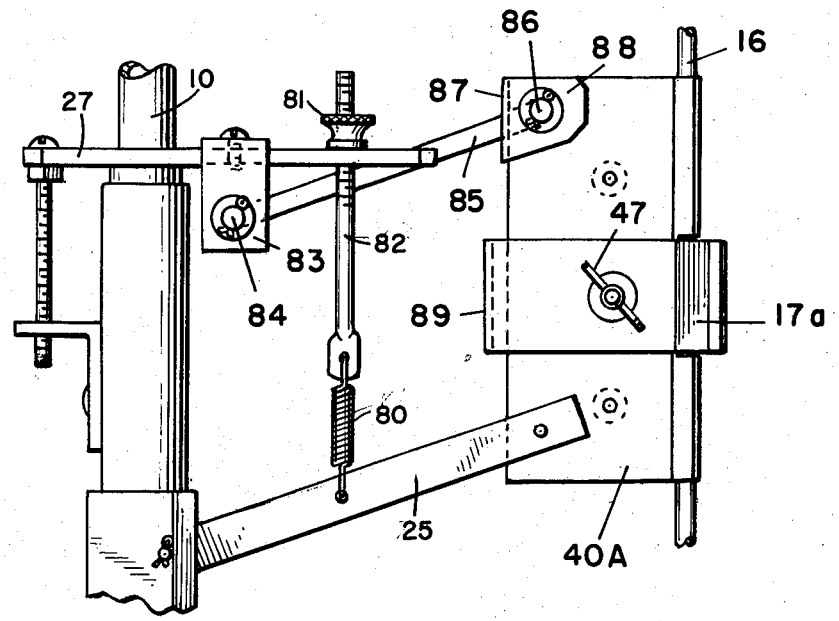
Figure 4 is a partial side elevation of a modification.

My device consists of a water inlet member 10, a valve structure, the casing of which is 11, a suspension arrangement including a guide 12, and a trough 14 having an enclosing hood 15, the hood and trough being assembled as a unit on an adjusting rod 16 secured by a clamp 17 on the guide 12.

When the chicks are very small the trough 14 is positioned even as close as an inch to the ground and at this time the rod 16 is placed at its lowest point with its top end just inside of the clamp 17. In order that the water shall be discharged at close to or below the water level in the trough 14 an extension 20 is provided which surrounds the casing 11 of the valve and the length of this extension is such that it may reach to the water level when the trough is at its lowest point. It must also be so arranged that as the trough is gradually raised as the chicks grow larger the extension will not interfere with the operating parts.

A chosen form of valve structure includes a simple barrel or casing 11 into which the permanently located water inlet member 10 extends by means of a well known member called a tip. This tip 21 has a port 22 which is closed by a plunger 23 which rests on the valve operating lever 25 which is pivoted as at 26 a bit closer to the right hand side, as seen in Figure 1, than to the left hand side of the casing 11 which, with the inlet member 10 forms the water supply pipe of the automatic poultry fountain. Consequently when the lever 25 rocks about its pivot 26 in either direction to a chosen amount from the horizontal or full discharge position the port 22 is closed. The volume of flow may readily be controlled by moving the bracket 27 locked between the tip 21 and the water inlet member 10 by a threaded bushing 28, all as a unit with respect to the pivot point 26. The particular means may vary, but a convenient form is a small L lug 30 fastened to the casing 11 and a screw 31 turns in the bracket 27 so that as the screw is rotated the casing is moved with respect to the water inlet member 10 and consequently with respect to the port 22.

On the bracket 27 is mounted a pedestal 34 at the top of which is mounted a link 35, pivoted as at 36 to the pedestal and pivoted as at 37 between the two guide members 90 and 91, which with the spacer washers 92 between them, form the guide 12. The lever 25 is similarly pivoted as at 38 between the two guide members 90 and 91 near the bottom of guide 12. These members are each notched as at 39 to accommodate and position the clamp 17 about centrally of the guide 12.

The clamp 17 may be of any desired form, a very convenient and inexpensive construction is to have two plates 40 and 41 spaced apart to engage opposite outer sides of the guide 12 and to touch each other at the rear. Each of the plates 40 and 41 flares outwardly at its free end as at 42 to form a simple short channel to direct the rod into the adjacent but much longer vertical channel, the sides of which are parallel with the sides of the shorter channel. The longer channel formed by the flaring ends 94 of the plates 90 and 91 extends the entire length or height of the guide 12 and is engaged by the rod 16 as the latter is being adjusted to raise or lower the hood 15 and also when the rod is clamped in place by tightening the thumb nut 47 on a short screw 95 passing loosely thru plates 40 and 41 as well as guide members 90 and 91.

The extension 20 could be of any form but since I prefer that the pivot 26 shall extend on both sides of the casing and the extension should clear L lug 30 as well as the two projecting ends of the pivot pin 26 and be clamped at the bottom, the configuration shown in Figure 3 is preferred. The screw 50 passes diametrically thru the tubular casing 11 and is threaded as at 51 to receive a nut 52. The bowed bar 53 loosely receives the screw 50 and binds the two free ends 55 and 56 of the extension which in the preferred form is merely bent from a rectangular piece of metal, having a back 54 and flaring sides 57 so that the cross section is somewhat in the nature of a pentagon not quite closed at the proximate edges of the strips or ends 55 and 56, so that a slot is formed the full length of the extension, which latter, it will be noted clears the head of screw 50, the L lug 30, the projecting ends of the pivot 26 and yet can be held in any position merely by slightly tightening the nut 52.

I prefer to have illumination of some sort within the head 15, and therefore mount on this head an electric lamp 62. A convenient method is to secure the socket 63 on the conical upper surface 64 of the head.

The central portion of the head is a cylinder 58 of a single piece of sheet metal, preferably outwardly ribbed as at 65 to impart strength and to form a stop for the downturned rim 66. The lower rib 61 is inwardly directed and forms a stop for engagement by the upper circular margin or top 67 of the trough. The bottom of the cylinder 58 fits snugly over the top 67 of the interior margin 68 of the trough. A metal disk bottom closure 69 abuts three stops 70 cast on the plastic trough and by putting a cotter pin 72 in the rod 16 I can use a thumb nut 73 to clamp the head and trough together for convenient handling as a unit.

The shape of the radial section of the trough is of considerable importance. The inside wall 68 of the trough slopes at an angle fairly close to 20° from vertical making this frusto conical wall 68 quite steep. The bottom 74 of the trough is at the junction of the steep conical side 68 and the curved outer wall 75 which if it were conical instead of curved would make an angle of about 45° to vertical and horizontal, but is preferably arcuate in cross section struck from a center located adjacent the top margin 67. The trough 14 is translucent and consequently the light from bulb 62 shows on the entire inside wall or inner margin 68 and the water in the trough, giving a glow on the outside curved wall 75 of the trough. This is readily sufficient to attract even the smallest chicks at night but the glow from the trough is wholly insufficient to light up any of the feed trays which preferably are not in close proximity to either of the fountains.

By having the outer wall 75 a portion of a sphere and by having the inner wall 68 rather steep the chicks are forced to disturb the water in the trough or pan to an extent sufficient to keep the particles of food, which may be placed in there, in motion so that other chicks remove the food thus misplaced while they are drinking water. The water is preferably about ¾" deep. The elevation of the outer rim of the fountain, that is, the edge of the outer wall with respect to the ground is such that the chicks have to stretch just a little to reach the water and the height of this rim above ground is well sufficient to keep the trough free from droppings.

The operation of the trough is as follows:

After the valve is adjusted for the volume of flow desired by moving the screw 31, the extension 20 is slipped over the tubular casing 11 and the rod 16 is received in the clamp 17. Before the trough has been thus affixed, the spring 80, controlled by nut 81 on stem 82 has been adjusted to hold the lever with the pivot end 38 to a desired height at which engagement of the lever and the plunger 23 will shut the water off. The weight of the trough even empty is sufficient to move the guide 12 downward. The lever 25 thus tends to become horizontal and water is admitted between the port 22 and the plunger which usually has at its top a valve seat of rubber but it may be a simple cylinder as illustrated. Water continues to flow until the total weight suspended by the link 35 and the lever 25 is sufficient to overcome the spring 80 and move the short arm of the lever 25 up to close the port and shut off the flow of water. The chicks drink from the annular trough and when sufficient amount of water is removed the spring 80 will raise the lever and allow more water to flow. Since the water inlet member 10 is stationary, when the device is first used for very small chicks the rod 16 is moved to its lowest point and the extension 20 is lowered by means of clip 53 until its end is either very close to the water level or it could even extend below the water level. As the chicks grow, the extension is moved upwardly step by step and the rod 16 is moved higher with respect to the clamp 17.

By virtue of the light 62 the trough is illuminated at night to a degree to attract the chicks but far below a point of illumination where the chicks would tend to crowd toward the light. The soft glow from the fountain seems to have far less attractive force than a bright light and hence in practice I have found that the small chicks remain away from the trough after drinking to a point a foot or more, thus avoiding the usual crowding and also providing plenty of room for chicks that are thirsty. The soft glow also avoids entirely the highly undesirable practice of eating at night. While nocturnal consumption of food does increase greatly the weight of the chicks for a short time, the good effect is very soon overbalanced by the lack of strength in the chicks; hence it is thought best to avoid any eating at night, but to provide plenty of water.

Because of the improved design of this trough if one adds only 6 ounces of water to an empty trough, the depth will be ⅝ of an inch, and a total of 8 ounces brings the depth to ¾ of an inch which is an ample amount to permit fully matured chickens such as hens to drink normally. Because the inside wall 68 of the trough is nearly vertical and the outer wall 75 curves outward away from the point of maximum depth, chickens easily reach the point with their beaks where the water is deepest without interference from the top edge of the outer part of the trough. This would not be true if the trough were simply a plain V-shape. The trough has a capacity of 24 ounces.

Figure 5:
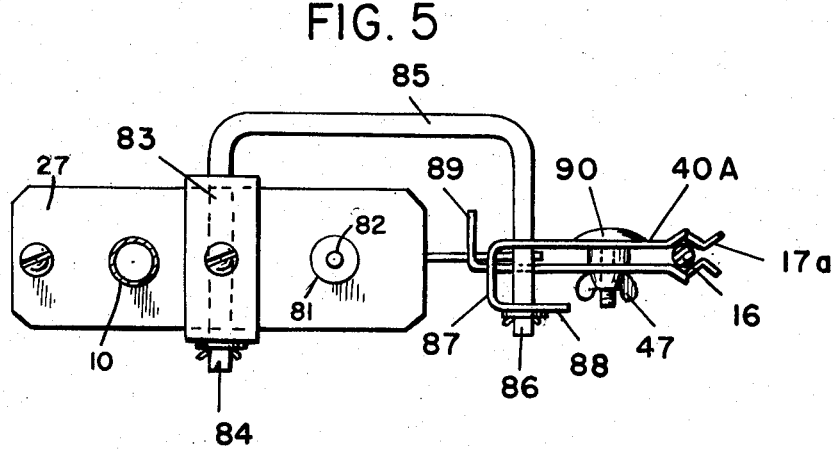
Figure 5 is a top plan view of the modification, partly in section.

A modified form of clamp and support, suitable for heavier fountains where greater stability is required, is shown in Figures 4 and 5. In this modification the bracket 27 instead of having the pedestal 34 secures at the same place a U-shaped bracket 83 in the two downturned ears of which is mounted one end 84 of a link 85 which corresponds to the link 35. The free end of this link is turned parallel to the portion 84 as at 86 corresponding to the pivot 37 in the other form. In the modification the plate 40A has a base portion 87 with an ear 88 forming two well spaced brackets giving a sturdy support to the pivot end 86 of the link 85. The clamp 17a is of somewhat simplified form being a flat sheet of metal with a right-angular guiding surface 89 and like its counterpart having the flare 42 for easy reception of rod 16. In the modification the screw 90, on which the thumb nut 47 turns, is permanently secured to the large plate 40A.

What I claim is:

1. In a poultry fountain the combination with a valved water pipe of a bracket extending laterally from said pipe, a pedestal rising from the bracket, a pair of parallel links one pivoted to the bracket and the other pivoted to the water supply pipe and constituting the valve operating lever, spring means connecting the bracket and the lower parallel link, a pair of guide members secured together and pivoted to the free end of said links providing an elongated vertical channel, a rod slidably engaging the channel, clamping means carried by the guide members for holding the rod in chosen adjusted position, a bottom closure plate secured to the lower end of said rod, a hood on said rod and an annular trough secured between said hood and said bottom plate, and vertically adjustable means for conveying water from the water supply pipe to a point adjacent the trough water level.

2. In a poultry fountain, a stationary, water inlet pipe, a valve member having a casing forming an extension of the pipe, supporting means resiliently supported with respect to the pipe and moveable to open and close the valve of said valve member, a lever pivoted to the valve member and to the supporting means, a link parallel to said lever, pivoted to the supporting means and turning about a pivot the axis of which is parallel to the pivot of the lever and is located proximate said casing.

3. The device of claim 2 in which the upper link is U-shaped and each of its pivoting ends is supported in spaced bearings, one of the spaced bearings being carried by the supporting means and the other spaced bearing being carried by a bracket mounted proximate the casing.

PERRY S. MARTIN.

REFERENCES CITED

The following references are of record in the file of this patent:

UNITED STATES PATENTS

| Number | Name | Date |
| --- | --- | --- |
| 1,415,178 | Imschweiler | May 9, 1922 |
| 1,473,097 | Holbrook | Nov. 6, 1923 |
| 1,485,712 | Reynolds | Mar. 4, 1924 |
| 1,653,525 | White | Dec. 20, 1927 |
| 1,664,691 | Langewisch | Apr. 3, 1928 |
| 1,747,195 | Triggs et al. | Feb. 18, 1930 |
| 1,793,431 | Pelmulder | Feb. 17, 1931 |
| 1,871,742 | Sabath | Aug. 16, 1932 |
| 1,908,939 | Venditti | May 16, 1933 |
| 2,031,723 | Martin | Feb. 25, 1936 |
| 2,043,477 | Imschweiler | June 9, 1936 |
| 2,295,964 | Null | Sept. 15, 1942 |
| 2,492,806 | Levine | Dec. 27, 1949 |
| 2,512,839 | Pruitt | June 27, 1950 |
| 2,519,736 | Bradley | Aug. 22, 1950 |
| 2,584,383 | Feck | Feb. 5, 1952 |